United States Patent
Zohoorian et al.

(10) Patent No.: US 12,082,296 B2
(45) Date of Patent: Sep. 3, 2024

(54) CONTROL OF ROAMING IN A WIRELESS NETWORK USING A VARIABLE MOBILITY THRESHOLD

(71) Applicant: Juniper Networks, Inc., Sunnyvale, CA (US)

(72) Inventors: Mohammad Zohoorian, San Francisco, CA (US); Ebrahim Safavi, Santa Clara, CA (US); Shmuel Shaffer, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 159 days.

(21) Appl. No.: 17/454,200

(22) Filed: Nov. 9, 2021

(65) Prior Publication Data
US 2023/0143729 A1   May 11, 2023

(51) Int. Cl.
*H04W 8/02* (2009.01)
*H04W 4/029* (2018.01)

(52) U.S. Cl.
CPC ............. *H04W 8/02* (2013.01); *H04W 4/029* (2018.02)

(58) Field of Classification Search
CPC ............. H04W 36/30; H04W 36/0085; H04W 36/00837; H04W 24/10; H04W 36/08; H04W 36/32; H04W 48/20; H04W 8/02; H04W 4/029
See application file for complete search history.

(56) References Cited

U.S. PATENT DOCUMENTS

| | | | |
|---|---|---|---|
| 9,832,082 B2 | 11/2017 | Dade et al. | |
| 10,638,409 B2 | 4/2020 | Ketonen et al. | |
| 10,862,742 B2 | 12/2020 | Singh | |
| 10,863,400 B1 | 12/2020 | Wang et al. | |
| 10,904,805 B1 | 1/2021 | Sheriff et al. | |
| 10,958,537 B2 | 3/2021 | Safavi | |
| 10,958,585 B2 | 3/2021 | Safavi | |
| 10,985,969 B2 | 4/2021 | Safavi | |
| 10,986,607 B2 | 4/2021 | Ta et al. | |

(Continued)

FOREIGN PATENT DOCUMENTS

CN    108307468 A  *  7/2018  ..........  H04J 11/0026

OTHER PUBLICATIONS

U.S. Appl. No. 16/835,757, filed Mar. 31, 2020, naming inventors Wang et al.

(Continued)

*Primary Examiner* — Dung Hong
(74) *Attorney, Agent, or Firm* — Shumaker & Sieffert, P.A.

(57) ABSTRACT

A network management system (NMS) is configured to control roaming in a wireless network using a variable mobility threshold. For a first wireless device associated with a current location, the NMS obtains at least one performance metric of a first wireless signal received by the first wireless device at the current location from a first AP of a plurality of APs, compares the at least one parameter of the first wireless signal to at least one performance metric of a second wireless signal received by at least one other wireless device at the current location from a second AP of the plurality of APs, and triggers a roaming operation of the first wireless device from the first AP to the second AP if the comparison satisfies a mobility threshold that varies based on the at least one performance metric of the first wireless signal.

20 Claims, 9 Drawing Sheets

(56) References Cited

U.S. PATENT DOCUMENTS

| | | | |
|---|---|---|---|
| 11,445,426 B1* | 9/2022 | Marupaduga | H04W 36/00837 |
| 2013/0065632 A1* | 3/2013 | Macias | H04W 36/00837 |
| | | | 455/525 |
| 2013/0337831 A1* | 12/2013 | Edge | H04W 4/02 |
| | | | 455/456.1 |
| 2017/0064536 A1* | 3/2017 | Katar | H04W 8/02 |
| 2017/0171793 A1 | 6/2017 | Hamilton et al. | |
| 2020/0236008 A1* | 7/2020 | Safavi | H04B 17/327 |
| 2021/0014760 A1* | 1/2021 | Kannan | H04W 36/245 |
| 2021/0099928 A1* | 4/2021 | Wang | H04W 36/0009 |

OTHER PUBLICATIONS

U.S. Appl. No. 17/303,222, filed May 24, 2021, naming inventor Safavi.

U.S. Appl. No. 16/915,447, filed Jun. 29, 2020, naming inventor Castagnoli.

U.S. Appl. No. 16/915,615, filed Jun. 29, 2020, naming inventor Castagnoli et al.

U.S. Appl. No. 16/915,381, filed Jun. 29, 2020, naming inventor Castagnoli et al.

U.S. Appl. No. 63/125,595, by Mohammad Zohoorian, filed Dec. 15, 2020.

Extended Search Report from counterpart European Application No. 22178456.4 dated Dec. 6, 2022, 11 pp.

Response to Extended Search Report dated May 15, 2023, from counterpart European Application No. 22178456.4 filed Nov. 8, 2023, 24 pp.

Communication pursuant to Article 94(3) EPC from counterpart European Application No. 22178456.4 dated Jun. 28, 2024, 10 pp.

* cited by examiner

|     | AP1   |        |     |     |         | —315A |
| --- | ---   | ---    | --- | --- | ---     | --- |
|     | y1    | y2     | ....| ....| ym      |     |
| x1  | SLE 1,1 | SLE1,2 |   |     | SLE1,m  |     |
| x2  |       |        |     |     |         |     |
| ... |       |        |     |     |         |     |
| ... |       |        |     |     |         |     |
| ....|       |        |     |     |         |     |
| Xn  | SLEn,1|        |     |     | SLEn,m  |     |

......
......
......

|     | APk     |         |     |     |          | —315M |
| --- | ---     | ---     | --- | --- | ---      | --- |
|     | y1      | y2      | ....| ....| ym       |     |
| x1  | SLE' 1,1| SLE' 1,2|     |     | SLE' 1,m |     |
| x2  |         |         |     |     |          |     |
| ... |         |         |     |     |          |     |
| ... |         |         |     |     |          |     |
| ....|         |         |     |     |          |     |
| Xn  | SLE' n,1|         |     |     | SLE' n,m |     |

FIG. 3B

CONTROL OF ROAMING IN A WIRELESS NETWORK USING A VARIABLE MOBILITY THRESHOLD

TECHNICAL FIELD

The disclosure relates generally to computer networks and, more specifically, to roaming of wireless client devices from one access point to another access point in a wireless network.

BACKGROUND

Commercial premises, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. As the client devices move throughout the premises, they may automatically switch or "roam" from one wireless access point to another, in-range wireless access point, so as to provide the users with seamless network connectivity throughout the premises.

SUMMARY

In general, this disclosure describes techniques for roaming in a wireless network using a mobility threshold that varies based on one or more service level experience (SLE) metrics. While a wireless device may improve its performance with respect to one wireless parameter, such as a received signal strength indicator (RSSI), by roaming from a first access point (AP) to a second AP, the roaming operation itself may degrade one or more other parameters of the SLE experienced by a wireless device due to a short interruption of the service when the device disassociates from the first AP and associates with the second AP. In addition, the process of disassociating from the first AP and associating with the second AP consumes computing resources and may add to the cost of mobility of the device. In a typical roaming operation, to reduce the need for computing resources and to prevent the dead time during the migration process, most systems do not invoke client mobility until the RSSI degrades to a very poor level.

A network management system (NMS) receives network data associated with a plurality of wireless client devices associated with a wireless network at a site. The network data is indicative of one or more aspects of wireless network performance. The NMS obtains, for a first wireless device associated with a current location, one or more performance metrics of a first wireless signal received by the first wireless device at the current location from a first AP of a plurality of APs. The performance metric(s) of the first wireless signal includes, for example, at least one of a received signal strength indicator (RSSI), a signal-to-noise ratio (SNR), a bandwidth, a jitter, a bitrate, and a packet loss.

In accordance with one or more techniques of the disclosure, rather than implementing a fixed threshold to determine whether to roam from a first AP to a second AP, a network management system (NMS) implements a mobility threshold that varies based on the one or more performance metrics of the first wireless signal received by the first wireless device at the current location from the first AP.

For example, if the performance metric(s) of the first wireless signal is indicative of a relatively "good" service level experience (SLE), the mobility threshold is set to be relatively higher (in other words, a greater degree of improvement is required in order to trigger a roaming operation), and if the performance metric(s) of the first wireless signal is indicative of a relatively "poor" service level, the mobility threshold is set to be relatively lower (in other words, a lesser degree of improvement is required in order to trigger a roaming operation). In this way, the degree of improvement needed to trigger roaming from the first AP to the second AP is relatively larger when the service level experienced by the first wireless device associated with the first AP is relatively "higher." In such examples, given the fact that the service level is relatively satisfactory, the NMS triggers mobility to the second AP only if the improvement that can be obtained by roaming to the second AP is relatively larger. Conversely, the degree of improvement needed to trigger roaming from the first AP to the second AP is relatively smaller when the experience level of the wireless device associated with the first AP is relatively "lower." In such examples, given the fact that the service level is relatively poorer, the NMS triggers mobility to the second AP even if the improvement that can be obtained by roaming to the second AP is relatively small.

In one example, the disclosure is directed to a method comprising: for a first wireless device associated with a current location, obtaining at least one parameter of a first wireless signal received by the first wireless device at the current location from a first AP of a plurality of APs; comparing the at least one parameter of the first wireless signal to at least one parameter of a second wireless signal received by at least one other wireless device at the current location from a second AP of the plurality of APs; and triggering a roaming operation of the first wireless device from the first AP to the second AP if the comparison satisfies a mobility threshold that varies based on the at least one parameter of the first wireless signal.

In another example, the disclosure is directed to a system comprising a plurality of access point devices (APs) configured to provide a wireless network; and a network management system comprising one or more processors configured to: for a first wireless device associated with a current location, determine at least one parameter of a first wireless signal received by the first wireless device at the current location from a first AP of the plurality of APs; compare the at least one parameter of the first wireless signal to at least one parameter of a second wireless signal received by at least one other wireless device at the current location from a second AP of the plurality of APs; and trigger a roaming operation of the first wireless device from the first AP to the second AP if the comparison satisfies a mobility threshold that varies based on the at least one parameter of the first wireless signal.

In another example, the disclosure is directed to a non-transitory computer readable medium comprising instructions that when executed by one or more processors cause the one or more processors to: for a first wireless device associated with a current location, obtain at least one parameter of a first wireless signal received by the first wireless device at the current location from a first AP of a plurality of APs; compare the at least one parameter of the first wireless signal to at least one parameter of a second wireless signal received by at least one other wireless device at the current location from a second AP of the plurality of APs; and trigger a roaming operation of the first wireless device from the first AP to the second AP if the comparison satisfies a mobility threshold that varies based on the at least one parameter of the first wireless signal.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3B illustrates example location mappings generated by a roaming manager to store location data with respect to one or more performance metrics for each AP in a wireless network.

DETAILED DESCRIPTION

In general, this disclosure describes techniques for roaming in a wireless network using a mobility threshold that varies based on one or more service level experience (SLE) metrics. While a wireless device may improve its performance with respect to one wireless parameter, such as a received signal strength indicator (RSSI), by roaming from a first access point (AP) to a second AP, the roaming operation itself may degrade one or more other parameters of the SLE experienced by a wireless device due to a short interruption of the service when the device disassociates from the first AP and associates with the second AP. In addition, the process of disassociating from the first AP and associating with the second AP consumes computing resources and may add to the cost of mobility of the device. In a typical roaming operation, to reduce the need for computing resources and to prevent the dead time during the migration process, most systems do not invoke client mobility until the RSSI degrades to a very poor level.

In accordance with one or more techniques of the disclosure, rather than implementing a fixed threshold to determine whether to roam from a first AP to a second AP, NMS 150 implements a mobility threshold that varies based on one or more performance metrics of the first wireless signal received by the first wireless device at the current location from the first AP. For example, if the performance metric(s) of the first wireless signal is indicative of a relatively "good" service level experience (SLE), the mobility threshold is set to be relatively higher (in other words, a greater degree of improvement is required in order to trigger a roaming operation), and if the performance metric of the first wireless signal is indicative of a relatively "poor" service level, the mobility threshold is set to be relatively lower (in other words, a lesser degree of improvement is required in order to trigger a roaming operation). In this way, the degree of improvement needed to trigger roaming from the first AP to the second AP is relatively larger when the service level experienced by the first wireless device associated with the first AP is relatively "higher." In such examples, given the fact that the service level is relatively satisfactory, the NMS triggers mobility to the second AP only if the improvement that can be obtained by roaming to the second AP is relatively larger. Conversely, the degree of improvement needed to trigger roaming from the first AP to the second AP is relatively smaller when the experience level of the wireless device associated with the first AP is relatively "lower." In such examples, given the fact that the service level is relatively poorer, the NMS triggers mobility to the second AP even if the improvement that can be obtained by roaming to the second AP is relatively small.

Figure 1:
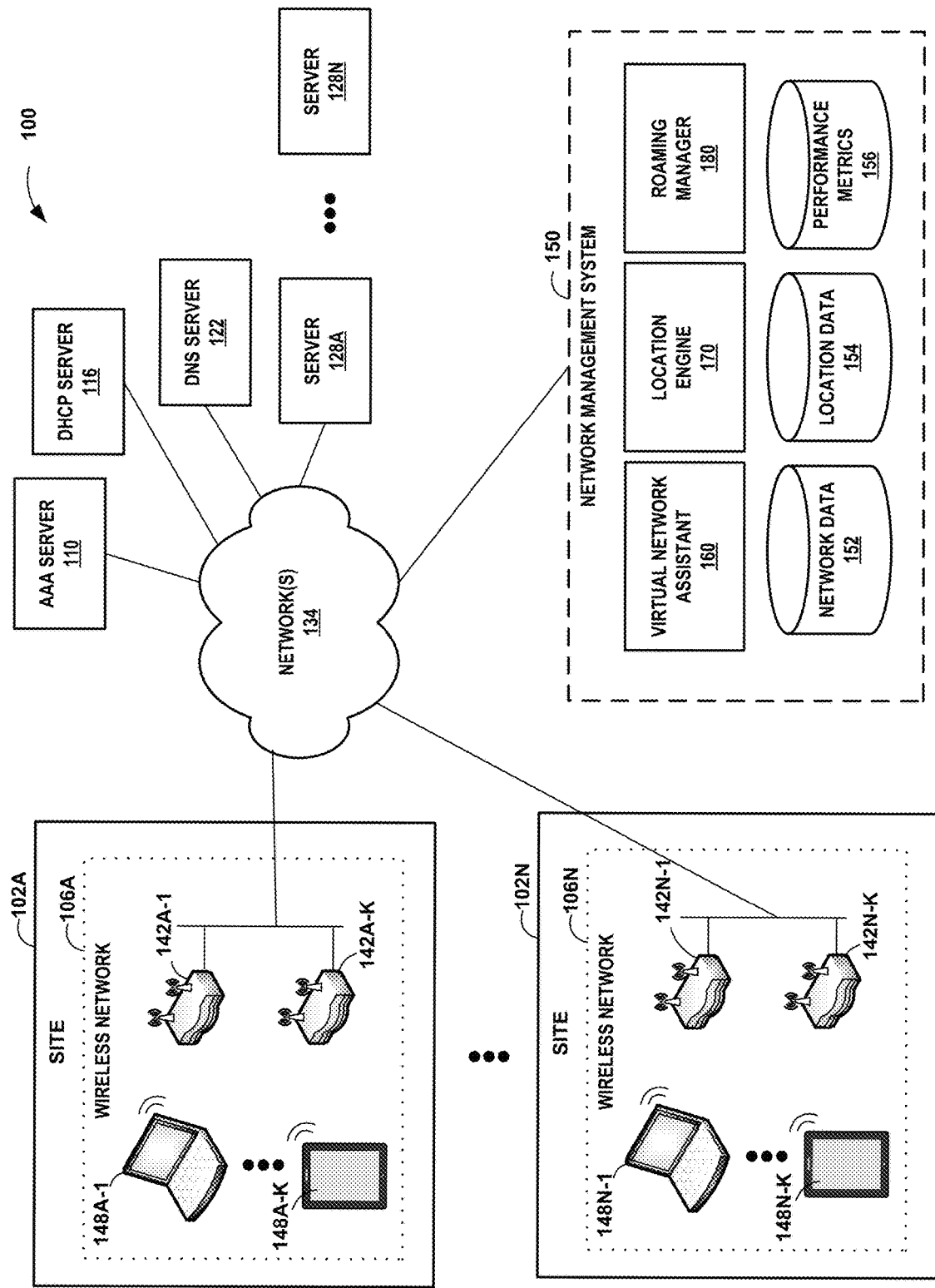
FIG. 1 is a block diagram of an example network system in which a network management system (NMS) is configured to automatically invoke roaming of a wireless client device in a wireless network based on a determined location of the client device in accordance with one or more techniques of the disclosure.

FIG. 1 is a diagram of an example network system 100 that implements techniques for control of roaming in a wireless network using a mobility threshold that varies based on one or more service level experience (SLE) metrics. Example network system 100 includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Each site 102A-102N includes a plurality of access points (APs), referred to generally as APs 142. For example, site 102A includes a plurality of APs 142A-1 through 142A-K. Similarly, site 102N includes a plurality of APs 142N-1 through 142N-K. Each AP 142 may be any type of wireless access point, including, but not limited to, a commercial or enterprise AP, a router, or any other device capable of providing wireless network access.

Each site 102A-102N also includes a plurality of client devices, otherwise known as user equipment devices (UEs), referred to generally as UEs 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring or other wearable device. UEs 148 may also include IoT client devices such as printers, security devices, environmental sensors, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 150. As shown in FIG. 1, the various devices and systems of network 100 are coupled together via one or more network(s) 134, e.g., the Internet and/or an enterprise intranet. Each one of the servers 110, 116, 122 and/or 128, APs 142, UEs 148, NMS 150, and any other servers or devices attached to or forming part of network system 100 may include a system log or an error log module wherein each one of these devices records the status of the device including normal operational status and error conditions.

In the example of FIG. 1, NMS 150 is a cloud-based computing platform that manages wireless networks 106A-106N at one or more of sites 102A-102N. As further described herein, NMS 150 provides an integrated suite of management tools and implements various techniques of the disclosure. NMS 150 monitors network data associated with wireless networks 106A-106N at each site 102A-102N, respectively, and manages network resources, such as APs 142 at each site, to deliver a high-quality wireless experience to end users, IoT devices and clients at the site. The network data may be stored in a database associated with NMS 150, such as network data 152. In general, NMS 150 may provide a cloud-based platform for network data acquisition, monitoring, activity logging, reporting, predictive analytics, network anomaly identification, invoking remedial actions, and alert generation.

NMS 150 may include a virtual network assistant (VNA) 160, a location engine 170 and a roaming manager 180. VNA 160 that analyzes network data received from one or more UEs 148 and/or one or more APs 142 in a wireless network, provides real-time insights and simplified troubleshooting for IT operations, and that may automatically invoke one or more remedial action(s) or provide recommendations to proactively address wireless network issues. VNA 160 may, for example, include a network data processing platform configured to process hundreds or thousands of concurrent streams of network data from sensors and/or agents associated with APs 142 and/or nodes within network 134. For example, VNA 160 of NMS 150 may include a network performance engine that automatically determines one or more performance metrics for each client device 148 in a wireless network 106. VNA 160 may also include an underlying analytics and network error identification engine and alerting system. VNA 160 may further provide real-time alerting and reporting to notify network administrators of any predicted events, anomalies, trends, and may perform root cause analysis and automated or assisted error remediation.

In some examples, VNA 160 of NMS 150 may apply machine learning techniques to identify the root cause of error conditions or poor wireless network performance metrics detected or predicted from the streams of event data. VNA 160 may generate a notification indicative of the root cause and/or one or more remedial actions that may be taken to address the root cause of the error conditions or poor wireless network performance metrics. If the root cause may be automatically resolved, VNA 160 may automatically invoke one or more remedial actions to address the root cause of the error condition or poor wireless network performance metrics, thus automatically and proactively improving the underlying wireless network performance metrics (e.g., one or more SLE metrics or other metrics indicative of one or more aspects of wireless network performance) and also automatically improving the user experience.

Example details of these and other operations implemented by the VNA 160 and/or NMS 150 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In operation, NMS 150 observes, continuously collects and/or receives network data 152. The network data is indicative of one or more aspects of wireless network performance. Network data 152 may take the form of data extracted from messages, counters and statistics, for example. The network data may be collected and/or measured by one or more UEs 148 and/or one or more APs 142 in a wireless network 106. Some of the network data may be collected and/or measured by other devices in the network system 100. In accordance with one specific implementation, a processor or computing device is part of the network management server 150. In accordance with other implementations, NMS 150 may comprise one or more processors, processing circuitry, computing devices, dedicated servers, virtual machines, containers, services or other forms of environments for performing the techniques described herein. Similarly, computational resources and components implementing VNA 160 may be part of the NMS 150, may execute on other servers or execution environments, or may be distributed to nodes within network 134 (e.g., routers, switches, controllers, gateways and the like).

NMS 150 receives network data associated with a plurality of wireless client devices 148 associated with a wireless network at a site. The network data is indicative of one or more aspects of wireless network performance. For example, NMS 150 obtains, for a first wireless device (e.g., UE 148) associated with a current location, one or more performance metrics for a first wireless signal received by the first wireless device at the current location from a first AP of a plurality of APs (e.g., APs 142). The performance metric(s) may include, for example, at least one of a received signal strength indicator (RSSI), a signal-to-noise ratio (SNR), a bandwidth, a jitter, a bitrate, and a packet loss.

In accordance with one or more techniques of the disclosure, NMS 150 implements a mobility threshold that varies based on the performance metric(s) of the first wireless signal received by the first wireless device at the current location from the first AP. For example, if the performance metric(s) of the first wireless signal is indicative of a relatively "good" service level experience (SLE), the mobility threshold is set to be relatively higher (in other words, a greater degree of improvement is required in order to trigger a roaming operation), and if the performance metric(s) of the first wireless signal is indicative of a relatively "poor" service level, the mobility threshold is set to be relatively lower (in other words, a lesser degree of improvement is required in order to trigger a roaming operation). In this way, the degree of improvement needed to trigger roaming from the first AP to the second AP is relatively larger when the service level experienced by the first wireless device associated with the first AP is relatively "higher." In such examples, given the fact that the service level is relatively satisfactory, NMS 150 triggers mobility to the second AP only if the improvement that can be obtained by roaming to the second AP is relatively larger. Conversely, the degree of improvement needed to trigger roaming from the first AP to the second AP is relatively smaller when the experience level of the wireless device associated with the first AP is relatively "lower." In such examples, given the fact that the service level is relatively poorer, NMS 150 triggers mobility to the second AP even if the improvement that can be obtained by roaming to the second AP is relatively small.

The current location of the first wireless device may be received from, for example, a location engine configured to determine the location of each of the plurality of wireless devices associated with the wireless network.

To determine the degree of improvement that may be achieved by roaming from the first AP to a second AP, NMS 150 compares the performance metric(s) of the first wireless signal obtained from the first AP to the performance metric(s) of a second wireless signal received by at least one other wireless device at the current location from the second AP of the plurality of APs. NMS 150 triggers a roaming operation of the first wireless device from the first AP to the second AP if the comparison satisfies the variable mobility threshold.

In some examples, the performance metric(s) of the second wireless signal includes a historical aggregated SLE vector of the second wireless signal received by a plurality of wireless devices at the current location (or in the same "region" as the current location) from the second AP of the plurality of APs. In this way, the amount of improvement that can be expected by roaming to the second AP can be determined based on the historical experience of a plurality of APs associated with the second AP at the current location.

In another example, in the event there is a second wireless device in the proximity of the first device (e.g., in the same "region" as the current location of the first wireless device) which is associated with a second AP, rather than using the historical aggregated SLE measurements associated with the second AP, the techniques of the disclosure may use real-time SLE measurements of a second wireless signal received by the second wireless device at the current location from the second AP (or an aggregation of real-time SLEs experienced by a plurality of wireless devices in the current location and associated with the second AP).

The techniques of the disclosure provide one or more technical advantages and practical applications. For example, the techniques enable NMS 150 to apply a variable mobility threshold to determine whether to trigger a roaming event. In other words, for a wireless device experiencing a fairly good SLE, the amount of improvement needed to trigger a roaming operation from a first AP to a second AP required to trigger a roaming event is relatively higher. Conversely, for a wireless device experiencing a relatively poorer or lower SLE, the amount of improvement needed to trigger a roaming operation from the first AP to the second AP is relatively lower. Thus, the variable mobility threshold helps to balance the improvement that can be gained by roaming to a new AP with the costs associated with roaming by taking one or more performance metrics of the first wireless signal experienced by the wireless device and the relative amount of improvement that can be gained by roaming to the second AP into account.

In addition, in some examples, the determination as to whether a roaming operation should be triggered is based on multiple dimensions of the current and/or historical SLE vectors for wireless devices associated with a first AP and a second AP rather than only a single dimension, such as RSSI. This also increases the likelihood that a wireless device will experience an overall improvement in wireless network performance, rather than only an improvement in a single dimension, as a result of a roaming operation. Another advantage is that because the system monitors real-time SLEs and updates the historical aggregated SLE vectors associated with each wireless device from specific locations and associated with various APs on a continuous basis, the determination as to whether to trigger a roaming operation is adaptable to varying conditions of the wireless network. Thus, the techniques of the disclosure can reduce of the amount of time a wireless device experiences poor wireless network performance, and enhance wireless network performance from the perspective of the wireless device and the user.

In another example, the system monitors the specific application for which the wireless device utilizes the wireless network and tailors the specific aggregation of the various SLE vector(s) to emphasize the dimension(s) of the SLE that are important for the specific application. For example, packet loss may be important in the context of real time video calls while not so important for big data transfers which may employ a packet retry mechanism. Similarly, jitter may be important in the context of VoIP calls but totally of no consequences to data downloads.

In accordance with such examples, the variable threshold for triggering the roaming process is adapted to improve user experience that uses a specific application in real-time, rather than a fixed threshold which disregards the specific requirements of different applications.

Location engine 170 determines location data indicative of a physical location for each UE 148 at one or more times during each UE's 148 association with the wireless network 106. The location data may be stored as, for example, location data 154. Example techniques for determining location of client devices in a wireless network are described in, for example, U.S. application Ser. No. 16/676,812, filed Nov. 7, 2019, and entitled, "Wireless Signals for Location Determination," U.S. application Ser. No. 16/915,447, filed Jun. 29, 2020, and entitled, "Location Determination Based on Phase Differences," U.S. application Ser. No. 16/915, 615, filed Jun. 29, 2020, and entitled, "Aligned Multi-Wireless Device Location Determination," U.S. application Ser. No. 16/915,381, filed Jun. 29, 2020, and entitled, "Multi-Wireless Device Location Determination," and U.S. Provisional Application No. 63/125,595, filed on Dec. 15, 2020, and entitled "Determining Location Based on Dynamic Path Loss Exponent (PLE) and Intercept (INT) Estimation," all of which are incorporated by reference herein in their entirety.

Roaming manager 180 receives the location data determined by location engine 170 and the performance metrics determined by VNA 160. Based on these two inputs, roaming manager 180 associates, for each AP in the wireless network, each calculated location with the measured performance metrics measured by UEs 148 associated with the respective AP in that location. The result is a collection of mappings of the performance metrics per location for mobile devices associated with each AP in the wireless network. In other words, for each location (e.g., each x-y or x-y-z coordinate location), roaming manager 180 generates multiple mappings wherein each mapping is indicative of the performance metrics and associated locations determined for all client devices associated with a specific AP.

Although the techniques of the present disclosure are described in this example as performed by NMS 150, it shall be understood that techniques described herein may be performed by any other computing device(s), system(s), and/or server(s), and that the disclosure is not limited in this respect. For example, one or more computing device(s) configured to execute the functionality of the techniques of the disclosure may reside in a dedicated server or be included in any other server (such as any of servers 128A-128N) in addition to or other than NMS 150, or may be distributed throughout network 100, and may or may not form a part of NMS 150.

In addition or alternatively, in some examples, network nodes (e.g., routers or switches within network 134) and/or access points 142 may be configured to locally determine whether one or more variable mobility thresholds should be applied to one or more identified areas in a wireless network 106 at site 102.

Figure 2:
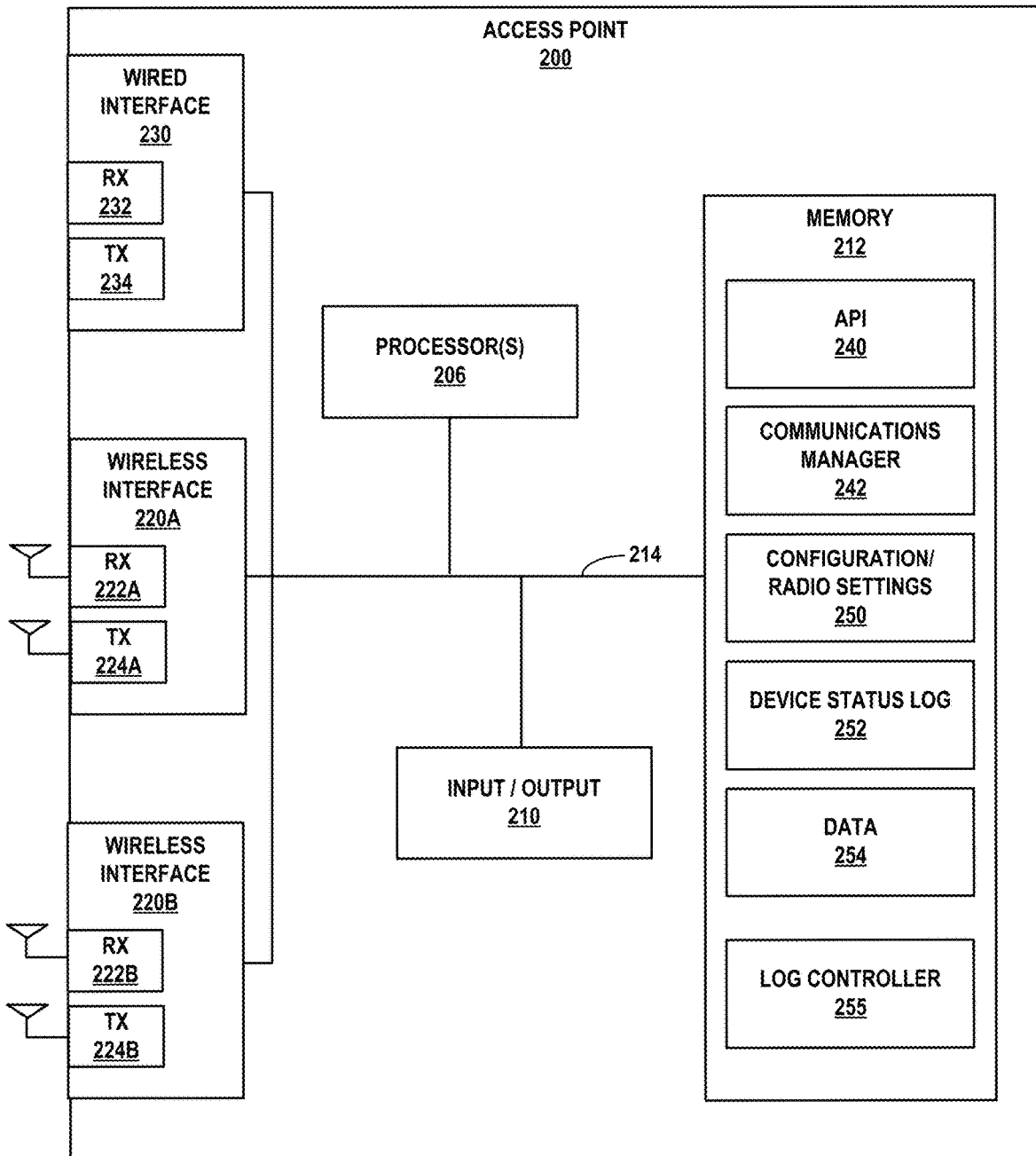
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of APs 142 as shown and described herein with respect to FIG. 1. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to network(s) 134 of FIG. 1. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1. First and second wireless interfaces 220A and 220B further include transmitters 224A and 224B, respectively, each including transmit antennas via which access point 200 may transmit wireless signals to wireless communications devices, such as UEs 148 of FIG. 1. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes a list of network parameters and/or network events specific to access point 200. The network parameters may include, for example, any network parameter indicative of one or more aspects of performance of the wireless network. In some examples, network parameters may include a plurality of states measured periodically as time series data that can be translated into one or more performance metrics. The network parameters may be measured by the UE devices 148, the APs 142/200 or another device associated with the wireless network.

Network events may include, for example, access point events and/or UE events. The access point events and/or UE events may each include a log of normal network events, neutral network events, and/or error network events. The network events may include, for example, memory status, reboot events, crash events, Ethernet port status, upgrade failure events, firmware upgrade events, configuration changes, authentication events, DNS events, DHCP events, roaming events, etc., as well as a time and date stamp for each event. Log controller 255 determines a logging level for the device based on instructions from NMS 150. Data 254 may store any data used and/or generated by access point 200, including data collected from UEs 148, such as data used to calculate one or more performance metrics, that is transmitted by access point 200 for cloud-based management of wireless networks 106A by NMS 150.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and managed by NMS 150 to optimize wireless network performance in real-time or on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

As described herein, AP device 200 may measure and report network data (i.e., network parameters and/or network event data) from status log 252 to NMS 150. The network data is indicative of one or more aspects of wireless network performance and/or status of the wireless network. The network data may be measured and/or determined by one or more of the UE devices and/or by one or more of the APs 200 in a wireless network.

In some examples, rather than roaming manager 180 implementing the roaming techniques of the disclosure, AP 200 may be configured to implement one or more of the roaming techniques described herein, and the disclosure is not limited in this respect.

Figure 3A:
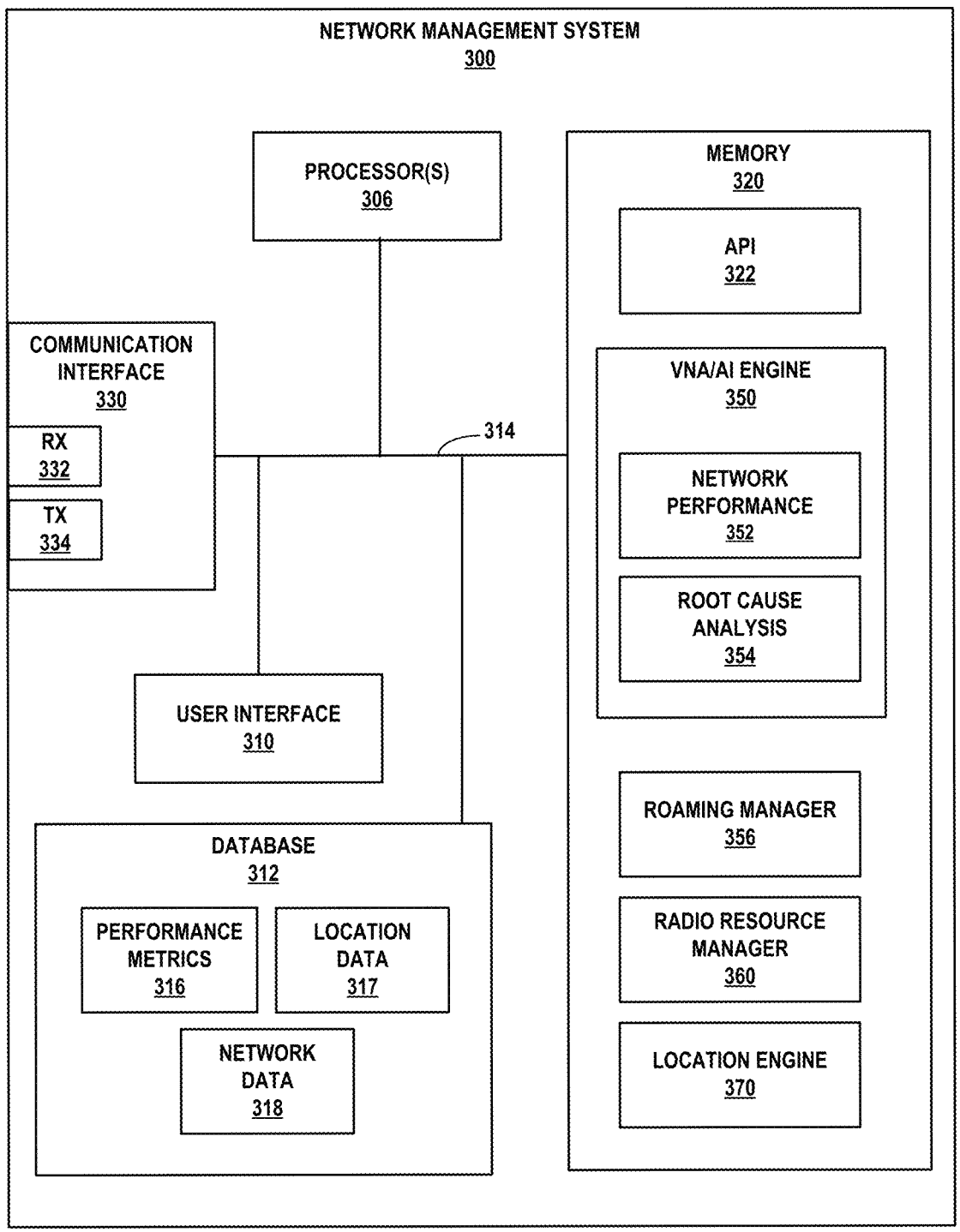
FIG. 3A is a block diagram of an example network management system configured to automatically invoke roaming of a wireless client device in a wireless network based on a determined location of the client device in accordance with one or more techniques of the disclosure.

FIG. 3A shows an example network management system (NMS) 300 configured in accordance with one or more techniques of the disclosure. NMS 300 may be used to implement, for example, NMS 150 in FIG. 1. In such examples, NMS 300 is responsible for monitoring and management of one or more wireless networks 106A-106N at sites 102A-102N, respectively. In some examples, NMS 300 receives network data collected by APs 200 from UEs 148, such as network data used to calculate one or more performance metrics, and analyzes this data for cloud-based management of wireless networks 106A-106N. In some examples, NMS 300 may be part of another server shown in FIG. 1 or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 142, servers 110, 116, 122, 128 and/or any other devices or systems forming part of network 100 such as shown in FIG. 1. The data and information received by NMS 300 may include, for example, network data and/or event log data received from access points 200 used by NMS 300 to remotely monitor and/or control the performance of wireless networks 106A-106N. NMS may further transmit data via communications interface 330 to any of network devices such as APs 142 at any of network sites 102A-102N to remotely manage wireless networks 106A-106N.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 320 includes an API 322, a virtual network assistant (VNA)/AI engine 350, a radio resource management (RRM) engine 360, roaming manager 356, and a location engine 370. VNA engine 350 includes a network performance engine 352 and a root cause analysis engine 370. NMS 300 may also include any other programmed modules, software engines and/or interfaces configured for remote monitoring and management of wireless networks 106A-106N, including remote monitoring and management of any of APs 142/200.

Network performance module 352 enables set up and tracking of thresholds for one or more performance metrics for each of wireless networks 106A-106N. Network performance module 352 further analyzes network data collected by APs and or UEs associated with wireless networks 106A-106N, such as any of APs 142 from UEs 148 in each wireless network 106A-106N. For example, APs 142A-1 through 142A-K collect network data from UEs 148A-1 through 148A-K currently associated with wireless network 106A. This data, in addition to any network data collected by one or more APs 142A-1 through 142A-K in wireless network 106A, is transmitted to NMS 300, which executes network performance module 352 to determine one or more performance metrics for each UE 148A-1 through 148A-K associated with wireless network 106A. One or more of the performance metrics may further be aggregated to each AP at a site to gain insight into each APs contribution to wireless network performance at the site. The performance metrics track whether the service level meets the configured threshold values for each performance metric. In some examples, each performance metric may further include one or more classifiers. If a metric does not meet the configured threshold value for the site, the failure or degradation may be attributed to one of the classifiers to further understand how and/or why the failure or degradation occurred.

Example SLE metrics and their classifiers that may be determined by NMS 300 are shown in Table 1. The performance metrics may also include any other metric or parameter indicative of one or more aspects of wireless network performance. For example, the performance metric(s) may include any one or more of a received signal strength indicator (RSSI), a signal-to-noise ratio (SNR), a bandwidth, a jitter, a bitrate, and a packet loss.

TABLE 1

| | |
|---|---|
| Time to Connect | The number of connections that took longer than a specified threshold to connect to the internet. Classifiers: association, authorization, DHCP, internet services |
| Throughput | The amount of time, that a client's estimated throughput is below a specified threshold. Classifiers: capacity, coverage, device capability, network issues |
| Coverage | The number of user minutes that a client's RSSI as measured by the access point is below a specified threshold. Classifiers: asymmetry downlink, asymmetry uplink, Wi-Fi interference |
| Capacity | The number of user minutes that a client experiences "poor" capacity. |

TABLE 1-continued

| | |
|---|---|
| | Classifiers: AP load, non-Wi-Fi interference, Wi-Fi interference |
| Roaming | The percentage of successful roams between 2 access points for clients that are within a specified target time that it takes for a client to roam. Classifiers: no fast roam, suboptimal 11r roam, suboptimal okc roam, slow roam |
| Successful Connects | The percentage of successful Authorization, Association, DHCP, ARP, and DNS and DNS attempts during an initial connection by a client to the network, when a client roams from one AP to the next, and on an on-going basis. Classifiers: association, authorization, DHCP |
| AP Health | This may be calculated based on AP Reboots, AP Unreachable events, and Site Down events. Classifiers: AP re-boot, AP Unreachable, Site Down |

RRM engine 360 monitors one or more metrics for each site 106A-106N in order to learn and optimize the RF environment at each site. For example, RRM engine 360 may monitor the coverage and capacity performance metrics for a wireless network 106 at a site 102 in order to identify potential issues with coverage and/or capacity in the wireless network 106 and to make adjustments to the radio settings of the access points at each site to address the identified issues. For example, RRM engine 360 may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 106 with an aim to improve the coverage and capacity performance metrics and thus to provide an improved wireless experience for the user.

VNA/AI engine 350 analyzes network data received from APs 142/200 as well as its own data to monitor performance of wireless networks 106A-106N. For example, VNA engine 350 may identify when undesired or abnormal states are encountered in one of wireless networks 106A-106N. VNA/AI engine 350 may use root cause analysis module 354 to identify the root cause of any undesired or abnormal states. In some examples, root cause analysis module 354 utilizes artificial intelligence-based techniques to help identify the root cause of any poor performance metric(s) at one or more of wireless network 106A-106N. In addition, VNA/AI engine 350 may automatically invoke one or more remedial actions intended to address the identified root cause(s) of one or more poor performance metrics. Examples of remedial actions that may be automatically invoked by VNA/AI engine 350 may include, but are not limited to, invoking RRM 360 to reboot one or more APs and/or adjust/modify the transmit power of a specific radio in a specific AP, adding SSID configuration to a specific AP, changing channels on an AP or a set of APs, etc. The remedial actions may further include restarting a switch and/or a router, invoke downloading of new software to an AP, switch, or router, etc. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the network error.

NMS 300 includes location engine 370 that determines location information for each UE 148 associated with one of wireless networks 106. Roaming manager 356 receives the performance metrics determined by VNA engine 350 and the location information for each UE from location engine 350 and associates each performance metric with a location of the corresponding UE. For example, roaming manager 356 may generate one or more mappings that associate each set of historical performance metrics with a location of the corresponding UE and the corresponding AP with which the UE was associated based on the time the network data underlying the performance metric was obtained.

FIG. 3B illustrates example location mappings generated by a roaming manager 356 to store location data with respect to one or more performance metrics for each AP in a wireless network. In the example shown in FIG. 3B, roaming manager 356 generates a plurality of location mappings 315A-315M (referred to generally as location mappings 315), each corresponding to a different one of the plurality of APs 142 in a wireless network 102 at each of sites 106 (where M is the number of APs at the site). The example location mappings 315 have columns and rows that correspond to the physical location, e.g., region, here expressed in terms of x and y coordinate locations, of UEs associated with a wireless network. For example, each x and y location in the mappings 315 may correspond to an x-y coordinate location with respect to one or more known reference locations, e.g., regions, at the site. Although for simplicity of illustration the example location mappings 315 include 2-dimensional mappings (e.g., x-y coordinate locations), 3-dimensional mappings (e.g., x-y-z coordinate locations) may also be used, the disclosure is not limited in this respect. An entry at a particular row and column of each mapping 315A-315M includes one or more performance metrics (in this example designated as SLE metrics) of the UE at the location specified by the row and column of the table. In this way, data storage tables 315 aggregate historical measurements/performance metrics obtained by UEs from the same region/location and associated with the same AP.

In accordance with one or more techniques of the disclosure, roaming manager 356 of NMS 300 implements a variable mobility threshold. For example, if the performance metric(s) of a first wireless signal received by a wireless device from a first AP is indicative of a relatively "good" service level experience (SLE), the mobility threshold is set to be relatively higher (in other words, a greater degree of improvement is required in order to trigger a roaming operation from the first AP to a second AP), and if the performance metric(s) of the first wireless signal received from the first AP is indicative of a relatively "poor" service level, the mobility threshold is set to be relatively lower (in other words, a lesser degree of improvement is required in order to trigger a roaming operation from the first AP to the second AP). In this way, the degree of improvement needed to trigger roaming from the first AP to the second AP is relatively larger when the service level experienced by the first wireless device associated with the first AP is relatively "higher." In such examples, given the fact that the service level is relatively satisfactory, NMS 300 triggers mobility to the second AP only if the improvement that can be obtained by roaming to the second AP is relatively larger. Conversely, the degree of improvement needed to trigger roaming from the first AP to the second AP is relatively smaller when the experience level of the wireless device associated with the first AP is relatively "lower." In such examples, given the fact that the service level is relatively poorer, NMS 300 triggers mobility to the second AP even if the improvement that can be obtained by roaming to the second AP is relatively small.

The current location of the first wireless device may be received from, for example, location engine 370 configured to determine the location of each of the plurality of wireless devices associated with the wireless network.

To determine the degree of improvement that may be achieved by roaming from the first AP to a second AP, NMS 300 compares the performance metric(s) of the first wireless device obtained from the first AP to the performance metric(s) of a second wireless signal received by at least one other wireless device at the current location from the second AP of the plurality of APs. NMS 300 triggers a roaming operation of the first wireless device from the first AP to the second AP if the comparison satisfies the variable mobility threshold.

In some examples, the performance metric(s) of the second wireless signal includes a historical aggregated SLE vector of the second wireless signal received by a plurality of wireless devices at the current location (or in the same "region" as the current location) from the second AP of the plurality of APs. For example, the performance metric(s) may include the historical aggregated data associated with the second AP such as shown in FIG. 3B. In this way, the amount of improvement that can be expected by roaming to the second AP can be determined based on the historical experience of a plurality of APs associated with the second AP at the current location, e.g., region.

In another example, in the event there is a second wireless device in the proximity of the first device (e.g., in the same "region" as the current location of the first wireless device) which is associated with a second AP, rather than using the historical aggregated SLE measurements associated with the second AP, the techniques of the disclosure may use real-time SLE measurements of a second wireless signal received by the second wireless device at the current location from the second AP (or an aggregation of real-time SLEs experienced by a plurality of wireless devices in the current location and associated with the second AP).

If the variable mobility threshold is satisfied, roaming manager 356 automatically may notifies the UE about the imminent mobility instruction, provides the first AP an ID of the second AP, and instructs the first AP with which the UE is associated to invoke roaming of the UE. In some examples, roaming manager 356 automatically notifies the UE about eh imminent mobility instruction, and provides the ID of the second AP to the UE so as to guide the UE to roam to the second AP after disassociating from the first AP/ For example, upon receipt of the instruction to invoke roaming of an identified UE 148 to a new AP, the current AP, such as AP 142 and/or 200, may take steps to cause UE 148 to roam to the second AP. For example, the first AP may ignore further communications received from the identified UE 148, thus forcing the identified UE 148 to seek for one or more other APs in the wireless network that are potential roaming candidates. As another example, the first AP 200 may generate and transmit a disassociation message to the identified UE 148, thus forcing the identified UE 148 to seek for potential roaming candidates. In addition, in some examples, the NMS 150 may provide the first UE the ID of the second AP, thus guiding it to associate with the second AP as soon as the association with the first AP is severed. In this way, NMS 150 automatically invokes a roaming operation of the client device away from the first AP to a new AP at which the one or more performance metrics are improved, thus enhancing the user experience of the wireless network.

Figure 4:
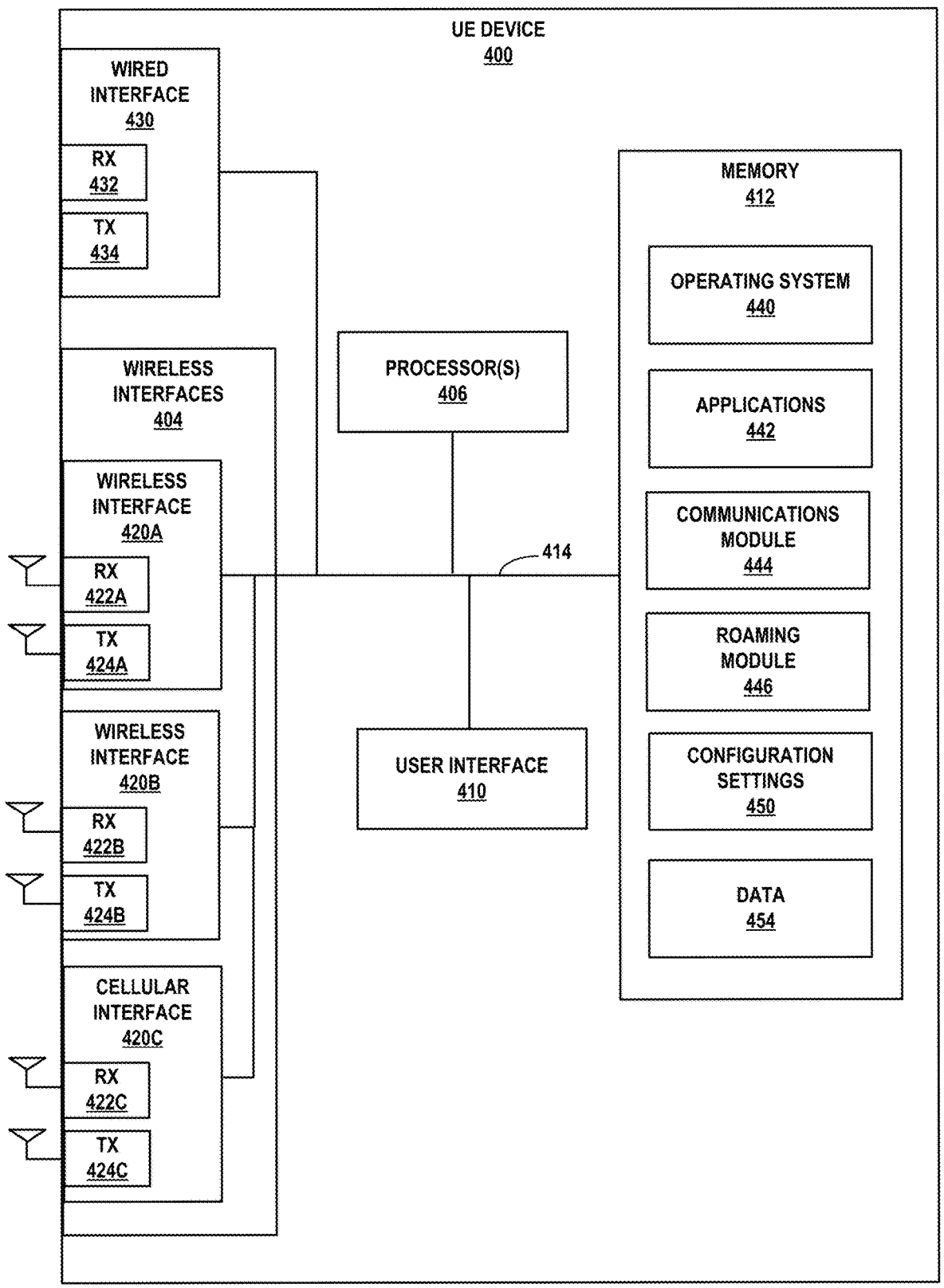
FIG. 4 is a block diagram of an example user equipment device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

In accordance with one or more techniques of the disclosure, network data indicative of one or more aspects of the performance of a wireless network (that is, data used by NMS 150 to calculate one or more performance metrics) is received from each UE 400 in a wireless network. For example, NMS 150 receives network data from UEs 148 in networks 106A-106N of FIG. 1. In some examples, NMS 150 receives relevant network data from UEs 148 on a continuous basis (e.g., every 2 seconds or other appropriate time period), and NMS may calculate one or more performance metrics for each UE on a periodic basis as defined by a first predetermined period of time (e.g., every 10 minutes or other predetermined time period).

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1, AP 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Data storage 454 may include, for example, a status/error log including network data specific to UE 400. The network data may include event data such as a log of normal events and error events according to a logging level based on instructions from the network management system (e.g., NMS 150/300). Data storage 454 may store any data used and/or generated by UE 400, such as network data used to calculate one or more performance metrics that is collected by UE 400 and transmitted to any of APs 142 in a wireless network 106 for further transmission to NMS 150.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for wired, each of wireless interface(s) 420A-420B and/or cellular interface 420C. Roaming module 446 includes program code that, when executed by processor(s) 406, enable UE 400 to perform one or more roaming operations in a wireless network 106. For example, roaming module 446 includes program code that, when executed by processor(s) 406, enable UE 400 to, in response to determining that a measured performance metric (such as an RSSI of a wireless signal received from a current AP, a signal-to-noise ratio of a wireless signal received from a current AP, a number of failed connection attempts, etc.) is below a configured roaming threshold, seek for potential roaming candidates among other APs 148 in the wireless network 106. As another example, roaming module 446 includes program code that, when executed by processor(s) 406, enable UE 400 to, in response to receipt of a disassociation message from a current AP, seek for potential roaming candidates among other APs 148 in the wireless network 106. In some examples, the ID of the second AP is provided to the UE by the NMS 150, based on either historical performance data of UEs from the region in which the UE is located, or alternatively based on real-time performance metrics experienced by other UEs located in the same location, e.g., region, corresponding to the location of the first UE.

Figure 5:
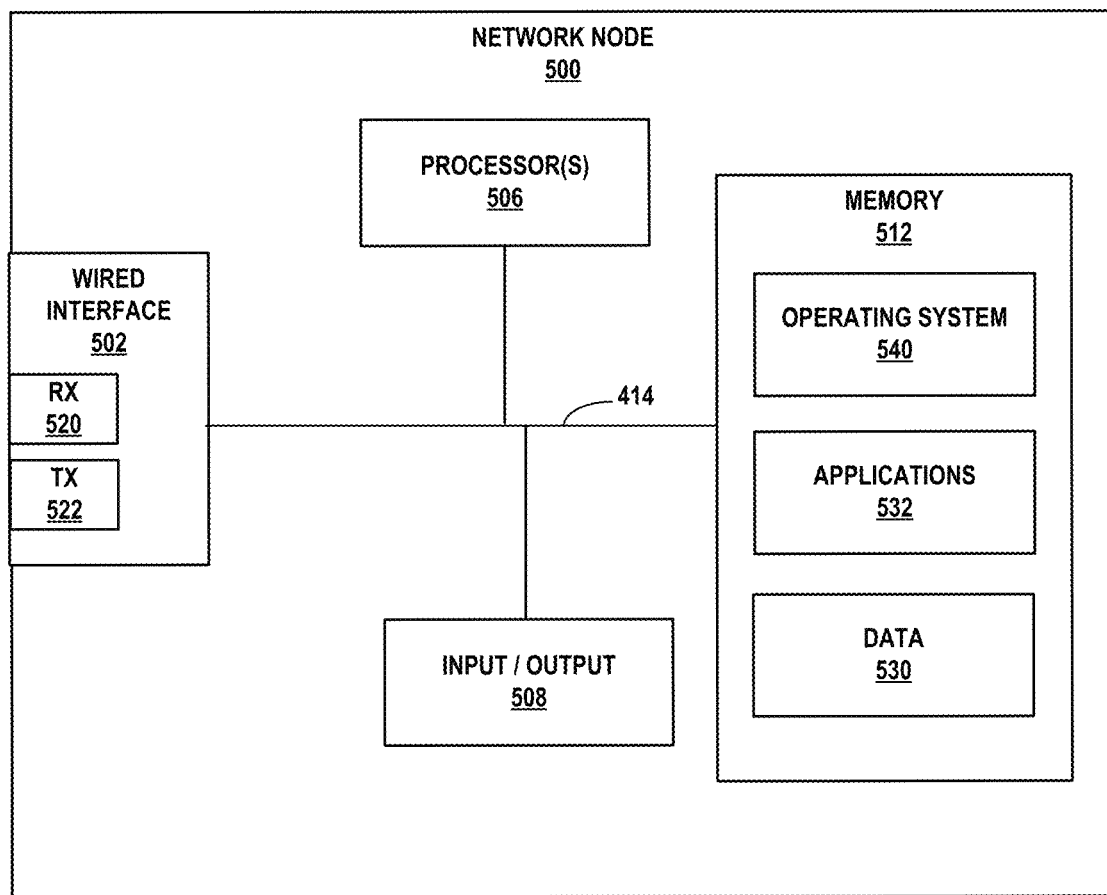
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server, DHCP server, DNS server, VNA, Web server, etc., or a network device such as, e.g., routers, switches or the like. In some embodiments, network node 400 of FIG. 4 is server 110, 116, 122, 128, of FIG. 1 or routers/switches of network 134 of FIG. 1.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may, and usually do, have multiple communication interfaces. Communications interface 502 includes a receiver 520 via which the network node 500, e.g. a server, can receive data and information, e.g., including operation related information, e.g., registration request, AAA services, DHCP requests, Simple Notification Service (SNS) lookups, and Web page requests. Communications interface 502 includes a transmitter 522, via which the network node 500, e.g., a server, can send data and information, e.g., including configuration information, authentication information, web page data, etc.

Memory 512 stores executable software applications 532, operating system 540 and data/information 530. Data 530 includes system log and/or error log that stores network data and/or performance metrics for node 500 and/or other devices, such as wireless access points, based on a logging level according to instructions from the network management system. In some examples, rather than the NMS 150 determining that a UE is located in an identified area associated with one or more poor performance metrics and automatically initiating a roaming operation, network node 500 may be configured to determine that a UE device is located in an identified area associated with one or more poor performance metrics and automatically invoke a roaming operation.

Figure 6A:
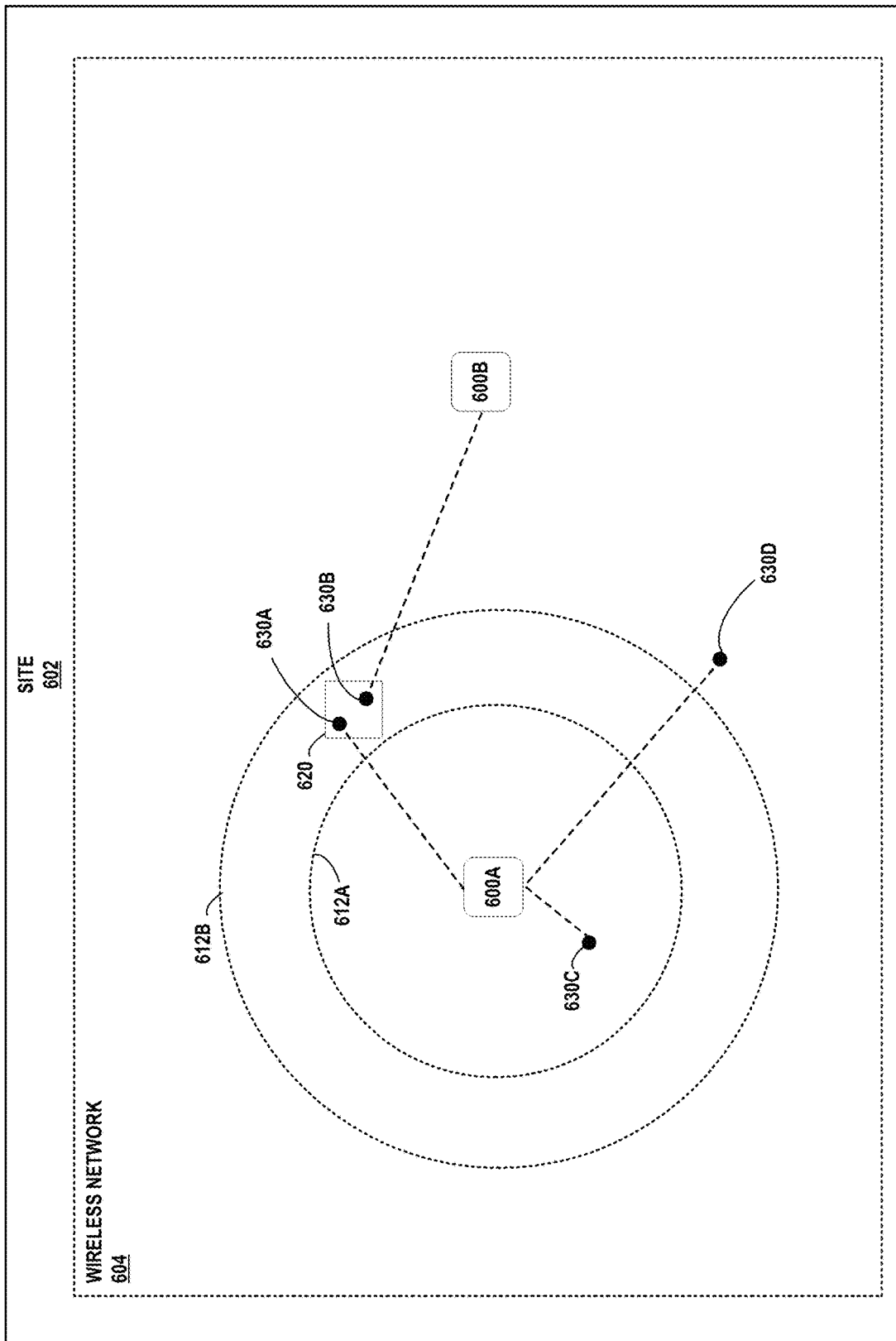
FIG. 6A is a diagram illustrating roaming of a wireless client device based on a determined location of the client device in accordance with one or more techniques of the disclosure.

FIG. 6A is a diagram illustrating roaming of a wireless client device based on a determined location of the client device in accordance with one or more techniques of the disclosure. An example site 602 includes two wireless access points, first AP 600A and second AP 600B, configured to provide a wireless network. Two UEs 630A and 630B are physically located at the substantially same location (e.g., within the same region) 620 at site 602. First UE 630A is associated with first AP 600A and second UE 630B is associated with second AP 600B, as indicated by the dashed lines. Although two APs 600A and 600B are shown in FIG. 6A for simplicity of illustration, site 602 may include a plurality of APs 600 deployed throughout site 602 in order to provide substantially continuous wireless network coverage for UEs at the site. In addition, any number of UEs 630 may be present at site 602 and associated with an AP of wireless network 604 at any given time.

Assume for purposes of FIG. 6A that UE 630A measures one or more performance metrics (e.g., RSSI) of the wireless signal received from AP 600A, and that the performance metric(s) is between a first threshold and a second threshold that define a range for which the variable mobility threshold is applied. For example, the first threshold RSSI is represented by dashed line 612A (representing a "good" RSSI). The second threshold RSSI is represented by dashed line 612B (representing a "poor" RSSI). Similarly, UE 630C is also associated with first AP 600A and experiences an RSSI that is "better" than the first threshold 612A. UE 630D is also associated with first AP 600A and experiences and RSSI that is "worse" than the second threshold 612B.

In accordance with one or more techniques of the disclosure, UE 630C (or any other UE experience an RSSI that is better than the first threshold 612A) will not roam to another AP as long as the RSSI is better than the first threshold 612A. UE 630D (or any other UE experiencing an RSSI that is worse than the second threshold 612B will always roam to another AP that can offer an improvement in the RSSI of the received wireless signal. For first UE 630A, which experiences an RSSI that is between the first threshold 612A and the second threshold 612B, NMS 150/300 applies a variable mobility threshold to determine whether to invoke a roaming operation of first UE 630A to another AP, for example, second AP 600B.

For example, if the performance metric(s) of the first wireless signal received from first AP 600A is indicative of a relatively "good" service level experience (SLE) (that is, it is relatively closer to the first threshold), the mobility threshold is set to be relatively higher (in other words, a greater degree of improvement is required in order to trigger a roaming operation of UE 630A from the first AP 600A to the second AP 600B). If the performance metric(s) of the first wireless signal received from first AP 600B is indicative of a relatively "poor" service level (that is, it is relatively closer to the second threshold), the mobility threshold is set to be relatively lower (in other words, a lesser degree of improvement is required in order to trigger a roaming operation of UE 630A from first AP 600A to second AP 600B). In this way, the degree of improvement needed to trigger roaming from the first AP 600A to the second AP 600B is relatively larger when the service level experienced by the first wireless device 630A associated with the first AP is relatively "higher." In such examples, given the fact that the service level is relatively satisfactory, NMS 150/300 triggers mobility to the second AP only if the improvement that can be obtained by roaming to the second AP is relatively larger. Conversely, the degree of improvement needed to trigger roaming from the first AP to the second AP is relatively smaller when the experience level of the wireless device associated with the first AP is relatively "lower." In such examples, given the fact that the service level is relatively poorer, NMS 150/300 triggers mobility to the second AP even if the improvement that can be obtained by roaming to the second AP is relatively small.

The current location of the first wireless device (e.g., location or region 620) may be received from, for example, a location engine configured to determine the location of each of the plurality of wireless devices associated with the wireless network, such location engine 370 as shown in FIG. 3.

To determine the degree of improvement that may be achieved by roaming from the first AP 600A to the second AP 600B (or similarly to any other AP), NMS 150/300 compares the performance metric(s) of the first wireless signal obtained by UE 630A from the first AP 600A to the performance metric(s) of a second wireless signal received by at least one other wireless device at the current location, for example, UE 630B from the second AP 600B. NMS 150/300 triggers a roaming operation of the first wireless device from the first AP to the second AP if the comparison satisfies the variable mobility threshold.

In some examples, the performance metric(s) of the second wireless signal includes a historical aggregated SLE vector of the second wireless signal received by a plurality of wireless devices at the current location 620 (or in the same "region" as the current location) from the second AP of the plurality of APs, such as mappings 315 as shown in FIG. 3B. In this way, the amount of improvement that can be expected by roaming to the second AP can be determined based on the historical experience of a plurality of UEs associated with the second AP at the current location.

In another example, as shown in the example of FIG. 6A, in the event there is a second wireless device in the proximity of the first device (e.g., in the same "region" as the current location of the first wireless device) which is associated with a second AP, rather than using the historical aggregated SLE measurements associated with the second AP, the techniques of the disclosure may use real-time SLE measurements of a second wireless signal received by the second wireless device at the current location from the second AP (or an aggregation of real-time SLEs experienced by a plurality of wireless devices in the current location and associated with the second AP).

Figure 6B:
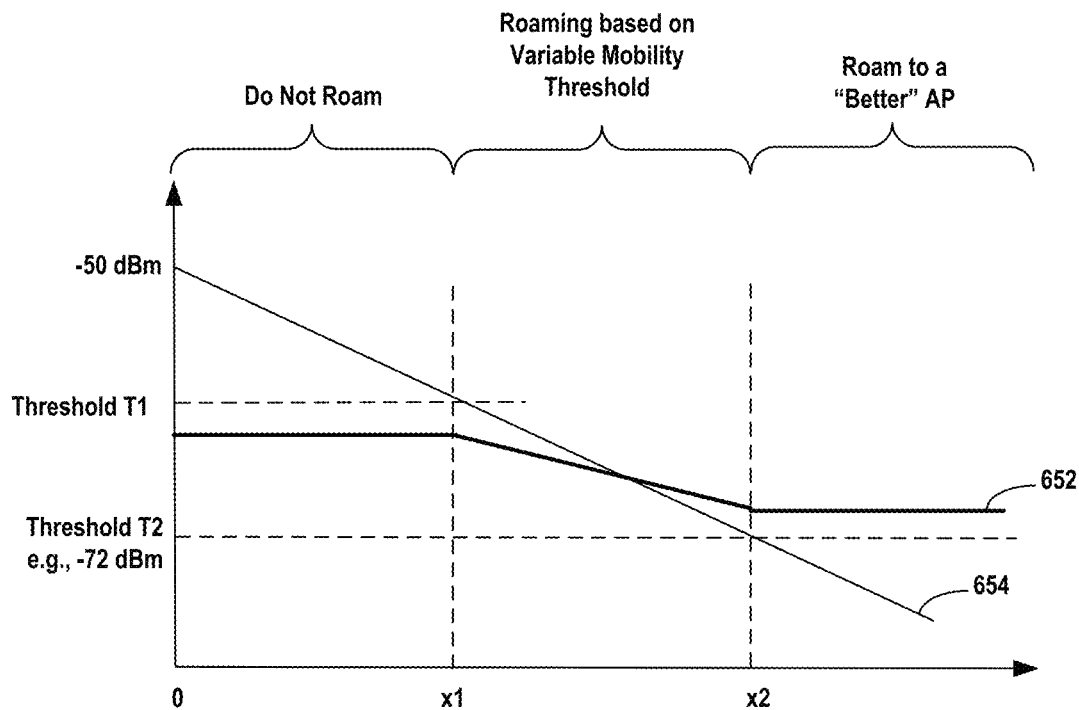
FIG. 6B is a diagram illustrating an example of location-based roaming in accordance with one or more techniques of the disclosure.

FIG. 6B is a diagram illustrating an example of control of roaming in a wireless network using a mobility threshold that varies based on one or more performance metric(s) in accordance with one or more techniques of the disclosure. Reference numeral 652 represents an example variable mobility threshold. Reference numeral 654 represents the RSSI of the client device. In the first region denoted by "Do Not Roam," the client device is at a distance closer than x1 to the first AP and the client does not roam because the RSSI value is better (higher) than a first threshold, T1. In the third region denoted by "Roam to a 'Better' AP," the RSSI is at a distance greater than x2 from its AP and the value of its RSSI is worse (smaller) than a second threshold, T2, and the client device roams to an AP that can provide a "better" RSSI if one is available.

In the second region between T1 and T2, denoted "Roaming based on Variable Mobility Threshold," NMS 150/300 determines a degree in improvement, e.g., a difference, between one or more performance metrics determined for the client device and the first AP and aggregated performance metrics determined based on real-time or historical data for a plurality of client devices associated with a second AP (and also additional APs, if any) at the same location (e.g., within the same region). The NMS 150/300 may further compare the determined difference with the variable mobility threshold. The NMS 150/300 thus compares the potential benefit, i.e., the amount of improvement in the one or more performance metric(s), that can be gained by roaming from the first AP to the second AP with the variable mobility threshold.

Figure 6C:
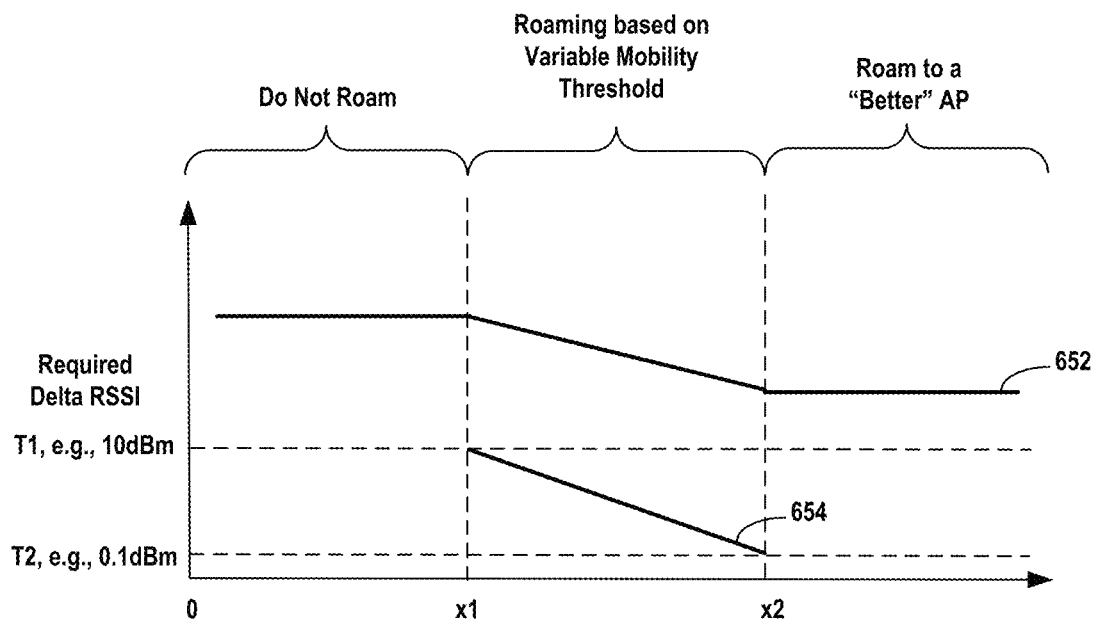
FIG. 6C is a diagram illustrating and example determination of a variable mobility threshold in accordance with one or more techniques of the disclosure.

As illustrated in FIG. 6C, an example of the variable mobility threshold that is applied by NMS 150/300 when the one or more performance metrics experienced by the wireless client device is between the first and second thresholds (T1 and T2) is indicated by reference numeral 652. The variable mobility threshold reflects the amount of benefit or improvement in the one or more performance metric(s) required in order to trigger roaming of a wireless device from a first AP to a second AP. Using RSSI as an example, when the at least one performance metric (e.g., historical aggregated RSSI or a real-time RSSI(s)) experienced by the client device is between the first threshold, T1, and the second threshold, T2, a variable mobility threshold, such as that indicated by reference numeral 652, is applied to determine whether the client device should roam from a first AP to a second AP. In this example, if the historically aggregated RSSI of signals received in the region from the second AP is at least 10 dBm "better" than the current value of RSSI of signal received from the first AP, NMS 150/300 automatically invokes a roaming operation. That is, NMS 150/300 automatically instructs the first AP to invoke a roaming operation by the client device. As the RSSI of the wireless signal received from the first AP decreases (e.g., as the client devices moves farther away from the first AP from position x1 toward position x2), the variable mobility threshold also decreases such that the degree or amount of improvement required to trigger roaming of the client device from the first AP to the second AP also decreases. In this way, NMS 150/300 is relatively more likely to invoke a roaming operation when then client device is experiencing relatively "worse" network performance and relatively less likely to invoke a roaming operation when the client device is experiencing relatively "better" network performance in the identified location.

In the examples of FIGS. 6B and 6C, the variable mobility threshold 652 varies linearly. In this specific example, the value of the variable mobility threshold is 10 dBm at the first threshold, T1, and decreases linearly to 0.1 dBm at the second threshold, T2. However, it shall be understood that the variable mobility threshold need not vary linearly, and may vary according to any linear or non-linear, and/or any continuous or discontinuous relationship, and the disclosure is not limited in this respect.

In some examples, the location-based roaming may take into account multiple dimensions of performance metrics. In such examples, to determine if a client device should roam from a first AP to a second AP, NMS 150/300 may determine, for each dimension of the performance metrics, the percentage of the variable mobility threshold fulfilled by the second AP. The roaming manager may then compute a composite (or aggregate) roaming measurement as:

$$R_{event}=1-(1-R1)*(1-R2)* \ldots (1-Rk),  \quad \text{Eq. 1}$$

where $R_{event}$ is the composite roaming measurement, k is the number of dimensions of the performance metrics, and R1, R2, . . . Rk is the percent of each performance metric fulfilled by the second AP.

The roaming manger automatically invokes roaming to the second AP if $R_{event}$>variable mobility threshold, e.g., 0.9, indicating the 90% of the variable mobility threshold is satisfied by the one or more dimensions of the performance metrics.

Figure 7:
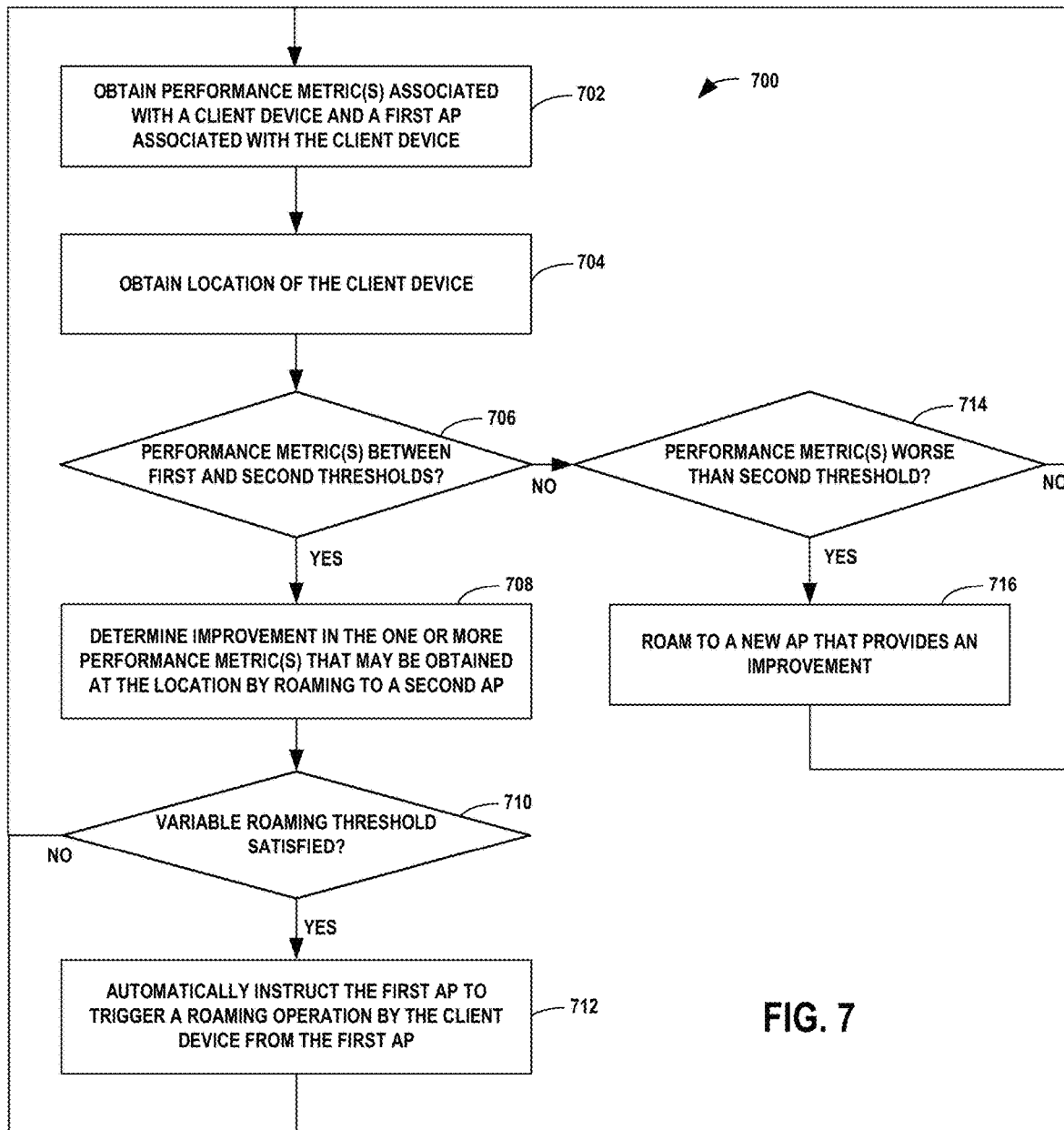
FIG. 7 is a flowchart of an example process by which a network management system determines a variable mobility threshold for one or more locations within a wireless network in accordance with one or more techniques of the disclosure.

FIG. 7 is a flowchart of an example process (700) by which a computing device, such as NMS 150 and/or 300 as shown in FIGS. 1 and 3, implements techniques for control of roaming in a wireless network using a mobility threshold that varies based on one or more service level experience (SLE) metrics, in accordance with one or more techniques of the disclosure.

A computing device, such as NMS 150/300, obtains one or more performance metric(s) associated with a client device and an AP with which the client device is currently associated in a wireless network (702). The client device may include, for example, any of UEs 148, 400 and/or 630, and the wireless network may include, for example, any of wireless networks 106 and/or 604. The performance metric(s) include data indicative of one or more aspects of wireless network performance. For example, the performance metric(s) may include at least one of a received signal strength indicator (RSSI), a signal-to-noise ratio (SNR), a bandwidth, a jitter, a bitrate, and a packet loss. The performance metric(s) may further include one or more service level experience metrics calculated by NMS 150/300.

The performance metric(s) may be received, for example, as time series data monitored at one or more periodic intervals. The performance metric(s) may be measured or collected by, for example, the client device and/or the AP with which the client device is associated, and transmitted to the NMS via network(s) 134.

The computing device obtains a physical location of the client device at the site (704). For example, the computing device may execute a location engine to determine an x-y or an x-y-z coordinate location of each client device with respect to one or more known reference locations at the site. In some examples, the location engine defines specific regions or areas and determines the specific region in which the UE is located. For example, the location engine may define the boundaries of one or more regions in terms of the x-y or x-y-z coordinate locations and determine the specific region in which the UE is located based on the UE's location.

The computing device determines whether the performance metric(s) fall within a range defined by the first and second thresholds where the variable mobility threshold is applied (706). For example, if the performance metric(s) include RSSI, the one or more processor(s) may compare the RSSI of a wireless signal received by a client device from a first AP to a first threshold and to a second threshold. If the performance metric(s) experienced by the client device is not between the first threshold and the second threshold (NO branch of 706) the variable mobility threshold does not apply. The computing device determines whether the performance metric(s) experienced by the client device is worse than the second threshold (714). If the performance metric(s) experienced by the client device are worse than the second threshold (YES branch of 714), the computing device automatically instructs the first AP to trigger a roaming operation by the client device to a new AP that provides any improvement in the performance metrics (714). If the performance metric(s) experienced by the client device is not worse than the second threshold (NO branch of 714), the performance metric(s) are better than the first threshold, the wireless signal received by the client device at the current location is associated with "good" performance metric(s) and no roaming is required. The computing device then returns to step (702) and repeats process (700) on a continuous basis to determine if and when to trigger a roaming operation by the client device to a new AP.

If the RSSI experienced by the client device is between the first threshold and the second threshold (YES branch of 706) the variable mobility threshold applies. The computing device determines the amount of improvement in the performance metric(s) that may be obtained at that location by roaming from the first AP to the second AP (708). For example, the computing device may compare the performance metrics of the first wireless signal received by the client device from the first AP to the performance metrics of a second wireless signal received by one or more other client devices in the same location from the second AP.

The performance metric(s) of the second wireless signal received from the second AP may include a historical aggregated SLE vector of the second wireless signal received by a plurality of wireless devices at the same location from the second AP. In another example, the performance metric(s) may include real-time SLE measurements of a second wireless signal received by the second wireless device at the current location from the second AP, or an aggregation of real-time SLEs experienced by a plurality of wireless devices at the current location and associated with the second AP.

The computing device determines whether the variable mobility threshold is satisfied (710). For example, the computing device may determine whether the variable mobility threshold is satisfied based on a comparison of the amount of improvement that will be obtained by roaming from the first AP to the second AP and the value of the variable mobility threshold corresponding to the performance metric(s) of the first wireless signal received by the client device at the location from the first AP. If the variable mobility threshold is not satisfied (NO branch of 710) the computing device does not trigger a roaming operation by the client device, and returns to step (702) to repeat the process.

If the variable mobility threshold is satisfied (YES branch of 710), the computing device automatically instructs the first AP to trigger a roaming operation by the client device from the first AP to the second AP (712). For example, the computing device may transmit an instruction to the current AP to ignore further communications received from the client device. In that example, after a number of unsuccessful communication attempts, the client device will be forced to perform one or more roaming operations, such as seeking for one or more potential roaming candidate APs in the wireless network. As another example, the one or more processor(s) may transmit an instruction to the current AP to transmit a disassociation message to the client device, thus forcing the client device to seek for potential roaming candidates. As another example, the computing device may transmit an updated "neighbor list" to the client device thus causing the client device to associate with an AP selected by the roaming manager. In this way, the computing device automatically invokes performance of a roaming operation of the client device away from the AP with which it is associated and at which it is experiencing one or more poor performance metrics to a new AP at which the one or more performance metrics are improved, thus enhancing the user experience of the wireless network. In another example, the system utilizes features of the 802.11v standard which defines a Transition Management protocol which allows an AP to request a mobile station (e.g., a UE) to transition to a specific AP, or suggest a set of preferred APs, due to network load balancing or termination of the connection with the current AP. This helps the UE identify the best AP from the list of candidates sent.

The computing device may continuously execute process (700) for each of a plurality of wireless client devices associated with a wireless network to manage roaming operations in a wireless network.

The techniques of the disclosure provide one or more technical advantages and practical applications. For example, the techniques enable the NMS to automatically invoke roaming of a client device determined to be present in an identified area within which other client devices have been known to experience poor wireless network performance. The NMS identifies one or more areas within a wireless network where client devices have experienced one or more aspects of poor wireless network performance. For any client device determined to be present within the identified area, the NMS determines whether a difference between one or more performance metrics for the UE and a first AP with which the client device is currently associated and one or more performance metric(s) experienced by other UEs associated with a second AP in that identified area satisfy a variable mobility threshold. If the variable mobility threshold is satisfied, the NMS automatically instructs the current AP with which the client device is associated to invoke performance of a roaming operation by the client device. As a result, the NMS can invoke performance of a roaming operation by client devices present in the identified area to disassociate from a current AP and associate with a new AP having improved wireless signal characteristic(s). Another advantage is that the criteria/threshold that determine when a client device needs to roam is location dependent rather than being a single fixed threshold for the whole network. Another advantage is that because the system monitors and updates the performance metrics associated with each location on a continuous basis, the variable mobility threshold(s) is adaptable to varying conditions of the network. Thus, the techniques of the disclosure reduce the amount of time the client device experiences poor wireless network performance, and enhance wireless network performance from the perspective of the client device and the user.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, 802.11k, 802.11v and 802.11r, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be cholic acid, a thioether, e.g., beryl-S-tritylthiol, a thiocholesterol, an aliphatic chain, e.g., dodecandiol or undecyl implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A method comprising:
    for a first wireless device associated with a current location, obtaining at least one parameter of a first wireless signal received by the first wireless device at the current location from a first access point (AP) of a plurality of APs;
    comparing the at least one parameter of the first wireless signal to at least one parameter of a second wireless signal received by at least one other wireless device at the current location from a second AP of the plurality of APs; and
    triggering a roaming operation of the first wireless device from the first AP to the second AP if the comparison satisfies a mobility threshold that varies based on the at least one parameter of the first wireless signal, wherein the mobility threshold corresponds to a varying degree of improvement to trigger the roaming operation of the first wireless device from the first AP to the second AP.

2. The method of claim 1, wherein the at least one parameter of the first wireless signal includes a received signal strength indicator (RSSI) of the first wireless signal and the at least one parameter of the second wireless signal includes an RSSI of the second wireless signal received by a second wireless device at the current location from the second AP of the plurality of APs.

3. The method of claim 1, wherein the at least one parameter of the first wireless signal includes an RSSI of the first wireless signal and the at least one parameter of the second wireless signal includes a historical aggregated RSSI of the second wireless signal received by a plurality of wireless devices at the current location from the second AP of the plurality of APs.

4. The method of claim 1, wherein the at least one parameter of the first wireless signal includes a service level experience (SLE) vector of the first wireless signal and the at least one parameter of the second wireless signal includes a SLE vector of the second wireless signal received by a second wireless device at the current location from the second AP of the plurality of APs.

5. The method of claim 1, wherein the at least one parameter of the first wireless signal includes a service level experience (SLE) vector of the first wireless signal and the at least one parameter of the second wireless signal includes a historical aggregated SLE vector of the second wireless signal received by a plurality of wireless devices at the current location from the second AP of the plurality of APs.

6. The method of claim 1, further comprising determining the mobility threshold based on the at least one parameter of the first wireless signal.

7. The method of claim 6, wherein the mobility threshold is relatively higher when the at least one parameter of the first wireless signal is relatively closer to a first value, and wherein the mobility threshold is relatively lower when the at least one parameter of the first wireless signal is relatively closer to a second value.

8. The method of claim 1, wherein the mobility threshold corresponds to a varying degree of improvement required between the at least one parameter of the first wireless signal and the at least one parameter of the second wireless signal to trigger the roaming operation of the first wireless device from the first AP to the second AP.

9. The method of claim 1, wherein the at least one parameter of the first wireless signal includes at least one of a received signal strength indicator (RSSI), a signal-to-noise ratio (SNR), a bandwidth, a jitter, bitrate, or a packet loss.

10. The method of claim 1, further comprising:
    determining that the first wireless device runs an application which is susceptible to a performance degradation associated with at least one performance metric, wherein the at least one performance metric includes at least one of a signal strength indicator (RSSI), a signal-to-noise ratio (SNR), a bandwidth, a jitter, a bitrate, or a packet loss; and
    wherein comparing the at least one parameter of the first wireless signal to the at least one parameter of the second wireless signal received by the at least one other wireless device at the current location from the second AP of the plurality of APs further includes increasing a weight of the at least one performance metric during the comparison.

11. A system comprising:
    a plurality of access point devices (APs) configured to provide a wireless network; and
    a network management system comprising one or more processors configured to:
        for a first wireless device associated with a current location, determine at least one parameter of a first wireless signal received by the first wireless device at the current location from a first AP of the plurality of APs;
        compare the at least one parameter of the first wireless signal to at least one parameter of a second wireless signal received by at least one other wireless device at the current location from a second AP of the plurality of APs; and
        trigger a roaming operation of the first wireless device from the first AP to the second AP if the comparison satisfies a mobility threshold that varies based on the at least one parameter of the first wireless signal, wherein the mobility threshold corresponds to a varying degree of improvement to trigger the roaming operation of the first wireless device from the first AP to the second AP.

12. The system of claim 11 further comprising a location engine configured to determine the current location of the first wireless device.

13. The system of claim 11, wherein the at least one parameter of the first wireless signal includes a received signal strength indicator (RSSI) of the first wireless signal and the at least one parameter of the second wireless signal includes an RSSI of the second wireless signal received by a second wireless device at the current location from the second AP of the plurality of APs.

14. The system of claim 11, wherein the at least one parameter of the first wireless signal includes an RSSI of the first wireless signal and the at least one parameter of the second wireless signal includes a historical aggregated RSSI of the second wireless signal received by a plurality of wireless devices at the current location from the second AP of the plurality of APs.

15. The system of claim 11, wherein the at least one parameter of the first wireless signal includes a service level experience (SLE) vector of the first wireless signal and the at least one parameter of the second wireless signal includes a SLE vector of the second wireless signal received by a second wireless device at the current location from the second AP of the plurality of APs.

16. The system of claim 11, wherein the at least one parameter of the first wireless signal includes a service level experience (SLE) vector of the first wireless signal and the at least one parameter of the second wireless signal includes a historical aggregated SLE vector of the second wireless signal received by a plurality of wireless devices at the current location from the second AP of the plurality of APs.

17. The system of claim 11, further comprising determining the mobility threshold based on the at least one parameter of the first wireless signal.

18. The system of claim 17, wherein the mobility threshold is relatively higher when the at least one parameter of the first wireless signal is relatively closer to a first value, and wherein the mobility threshold is relatively lower when the at least one parameter of the first wireless signal is relatively closer to a second value.

19. The system of claim 11, wherein the mobility threshold corresponds to a varying degree of improvement between the at least one parameter of the first wireless signal and the at least one parameter of the second wireless signal to trigger the roaming operation of the first wireless device from the first AP to the second AP.

20. Non-transitory computer readable media comprising instructions that when executed by one or more processors cause the one or more processors to:
 for a first wireless device associated with a current location, obtain at least one parameter of a first wireless signal received by the first wireless device at the current location from a first access point (AP) of a plurality of APs;
 compare the at least one parameter of the first wireless signal to at least one parameter of a second wireless signal received by at least one other wireless device at the current location from a second AP of the plurality of APs; and
 trigger a roaming operation of the first wireless device from the first AP to the second AP if the comparison satisfies a mobility threshold that varies based on the at least one parameter of the first wireless signal, wherein the mobility threshold corresponds to a varying degree of improvement to trigger the roaming operation of the first wireless device from the first AP to the second AP.

* * * * *